US008742935B2

(12) United States Patent
Cuddihy et al.

(10) Patent No.: US 8,742,935 B2
(45) Date of Patent: Jun. 3, 2014

(54) RADAR BASED SYSTEMS AND METHODS FOR DETECTING A FALLEN PERSON

(75) Inventors: Paul Edward Cuddihy, Ballston Lake, NY (US); Jeffrey Michael Ashe, Gloversville, NY (US); Corey Nicholas Bufi, Troy, NY (US); Sahika Genc, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 404 days.

(21) Appl. No.: 13/173,489

(22) Filed: Jun. 30, 2011

(65) Prior Publication Data

US 2013/0002434 A1    Jan. 3, 2013

(51) Int. Cl.
*G08B 23/00*    (2006.01)

(52) U.S. Cl.
USPC ............... 340/573.7; 340/573.4; 340/573.1

(58) Field of Classification Search
USPC ...................................................... 340/573.7
See application file for complete search history.

(56) References Cited

U.S. PATENT DOCUMENTS 7,567,200 B1 *  7/2009  Osterweil .................. 342/28

FOREIGN PATENT DOCUMENTS

| WO | 2008121448 A2 | 10/2008 |
| WO | 2010132850 A1 | 11/2010 |

OTHER PUBLICATIONS

Sanghyun Chang, Naoki Mitsumoto and Joel W. Burdick; "An algorithm for UWB radar-based human detection"; 978-1-4244-2871-7/09/$25.00 © 2009 IEEE; vol. 33 issue 1, pp. 1-6.
Po Li and De-Chun Wang; "A Quadrature Doppler Radar System for Sensing Human Respiration and Heart Rates"; Signal Processing (ICSP), 2010 IEEE 10th International Conference; pp. 2235-2238.
Paul Edward Cuddihy; "Method and System for Fall Detection"; Filed on Jun. 21, 2010;U.S. Appl. No. 12/819,260; 28Pages.
Paul Edward Cuddihy et al.; "Method and System for Detecting a Fallen Person Using a Range Imaging Device"; Filed on Jul. 30, 2010; U.S. Appl. No. 12/847321; 30Pages.
Meena Ganesh et al; "Physiology Monitoring and Alerting System and Process"; Filed on Mar. 23, 2011; U.S. Appl. No. 13/069,483.

* cited by examiner

*Primary Examiner* — Travis Hunnings
(74) *Attorney, Agent, or Firm* — Scott J. Asmus

(57) ABSTRACT

Methods, systems and non-transitory computer readable mediums that store instructions executable by one or more processors to perform a method for detecting a fallen person are presented. The present technique includes identifying a reference plane and a reference line in a designated space monitored using one or more range-controlled radars. These radars are coupled to one or more antennas configured to define fields of the range-controlled radars to one or more portions of the designated space, where at least one portion corresponds to the reference plane. The range-controlled radars detect presence of one or more parameters corresponding to a subject disposed in the designated space. The parameters, for example, include one or more physiological parameters and one or more motion parameters. The range-controlled radars then identify the subject as the fallen person if the one or more physiological parameters corresponding to the subject are detected proximate the reference plane.

17 Claims, 7 Drawing Sheets

500

0: Below Threshold
1: Above Threshold

| State | Top Resp RMS | Top Motion RMS | Bottom Resp RMS | Bottom Motion RMS | Position & Motion Description |
|---|---|---|---|---|---|
| 1 | 0 | 0 | 0 | 0 | Empty room |
| 2 | 0 | 0 | 0 | 1 | N/A |
| 3 | 0 | 0 | 1 | 0 | Supine & still |
| 4 | 0 | 0 | 1 | 1 | Supine & moving on floor |
| 5 | 0 | 1 | 0 | 0 | N/A |
| 6 | 0 | 1 | 0 | 1 | N/A |
| 7 | 0 | 1 | 1 | 0 | Sitting or Supine & Moving hands |
| 8 | 0 | 1 | 1 | 1 | Sitting or Supine & Moving arms |
| 9 | 1 | 0 | 0 | 0 | Standing & Still |
| 10 | 1 | 0 | 0 | 1 | Standing & Moving legs |
| 11 | 1 | 0 | 1 | 0 | Human & Animal & Both still |
| 12 | 1 | 0 | 1 | 1 | human & Animal & One moving |
| 13 | 1 | 1 | 0 | 0 | Standing or Sitting |
| 14 | 1 | 1 | 0 | 1 | Standing or Sitting & Moving legs |
| 15 | 1 | 1 | 1 | 0 | Human & Animal & One moving |
| 16 | 1 | 1 | 1 | 1 | Human & Animal & Both moving |

FIG. 5

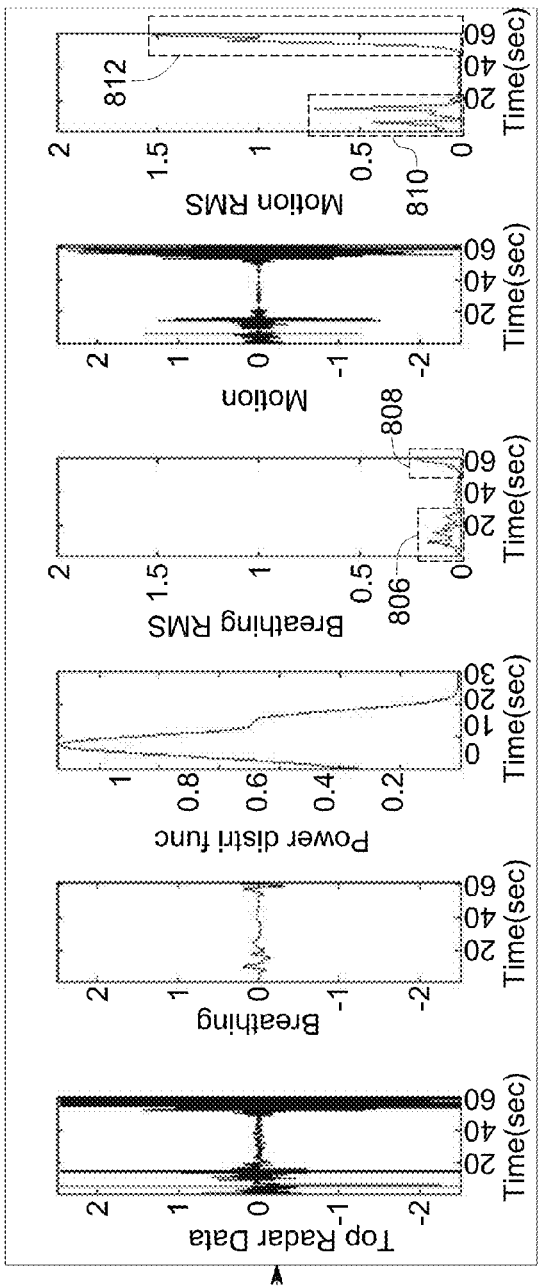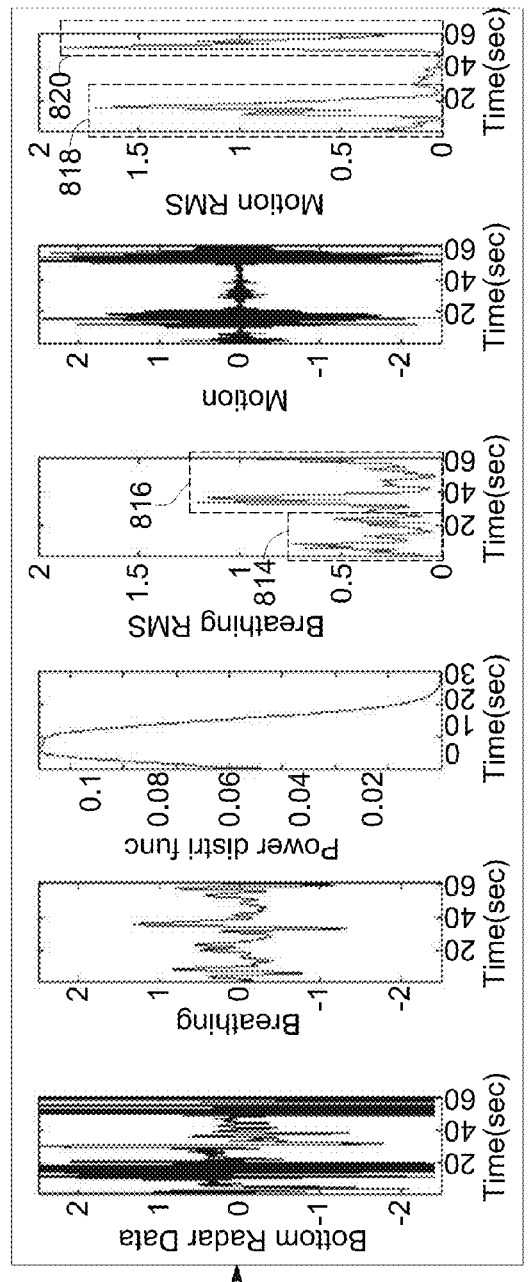

RADAR BASED SYSTEMS AND METHODS FOR DETECTING A FALLEN PERSON

BACKGROUND

Embodiments of the present technique relate generally to health monitoring, and more particularly to methods and systems for fall detection.

Unintentional falls are one of the most complex and costly health issues facing elderly people. Recent studies show that approximately one in every three adults aged 65 years or older falls each year, and about 30 percent of these falls result in serious injuries. Particularly, people who experience a fall event at home may remain on the ground for an extended period of time as help may not be immediately available. The studies indicate a high mortality rate amongst people who remain on the ground for an hour or more after a fall.

Fall detection (FD), therefore, has become a major focus of healthcare facilities. Conventionally, healthcare facilities employ nursing staff to monitor a person around the clock. Such care tends to be very costly and requires the nursing staff to be constantly alert. In settings such as assisted living or independent community life, however, the desire for privacy and the associated expense render such constant monitoring undesirable. Accordingly, FD systems based on wearable devices including sensors such as accelerometers, gyroscopes and/or microphones have been proposed. These devices, however, may need to be activated by a fallen person using a push-button to alert appropriate personnel or an associated health monitoring system. The FD systems based on such wearable devices, therefore, may be successful only if the person wears the sensing devices at all times and is physically and cognitively able to activate the alarm when an emergency arises.

Therefore, video-based FD systems are being widely investigated for efficient fall detection. Conventional video-based FD systems use rapid acceleration and impact as an indication of a falling person. Accordingly, the video-based FD systems process images of the person's motion in real time to evaluate if detected horizontal and vertical velocities corresponding to the person's motion indicate a fall event. Determining the horizontal and vertical velocities for detecting human falls in a large area involves use of complex computations, thus requiring a great deal of processing power and expensive equipment. Additionally, such video-based FD systems often fail to detect slow falls, for example, when an elderly person slides out of a bed or chair or otherwise breaks the fall but still finds him or herself on the floor in need of immediate assistance. Further, the video-based FD systems are also unable to detect falls obstructed by the presence of objects such as chairs and tables disposed in the field of view. Moreover, use of such video-based FD systems typically involves acquisition of personally identifiable information leading to numerous privacy concerns. Specifically, constant monitoring and acquisition of identifiable videos is considered by many people to be an intrusion of their privacy.

It is desirable to develop unobtrusive and cost-effective methods and systems for detecting human fall events. Specifically, there is a need for efficient FD systems and methods that non-intrusively yet reliably detect human fall events regardless of whether or not the detected motion includes rapid acceleration and impact. Furthermore, it is desirable to develop systems and methods that do not require line-of-sight and are capable of detecting fall events even in cluttered spaces with a fairly low instance of false alarms.

BRIEF DESCRIPTION

Certain aspects of the present technique are drawn to exemplary methods for detecting a fallen person. The methods include identifying a reference plane and a reference line in a designated space and monitoring the designated space using one or more range-controlled radars. These radars are coupled to one or more antennas configured to define fields of the one or more range-controlled radars to one or more portions of the designated space, where at least one portion corresponds to the reference plane. The range-controlled radars detect presence of one or more parameters corresponding to a subject disposed in the designated space. The one or more parameters, for example, include one or more physiological parameters and one or more motion parameters. The range-controlled radars then identify the subject as the fallen person if the one or more physiological parameters corresponding to the subject are detected proximate the reference plane.

Another aspect of the present technique includes a system for detecting a fallen person. The system includes one or more range-controlled radars positioned at one or more positions in a designated space. The range-controlled radars are configured to transmit a radar signal and receive a reflected radar signal from one or more subjects disposed in the designated space. The range-controlled radars are coupled to one or more antennas configured to define fields of the range-controlled radars to one or more portions of the designated space, where at least one of the portions corresponds to a reference plane disposed below a reference line in the designated space. The system further includes a processing unit communicatively coupled to the one or more range-controlled radars. Particularly, the processing unit is configured to identify the reference plane and the reference line disposed in the designated space. Additionally, the processing unit determines one or more parameters corresponding to the subjects proximate the reference plane using the reflected radar signal, where the one or more parameters include one or more physiological parameters and one or more motion parameters. The processing unit then identifies one of the subjects as the fallen person if the one or more physiological parameters corresponding to the subject are determined to be proximate the reference plane.

A further aspect of the present technique corresponds to a non-transitory computer readable medium that stores instructions executable by one or more processors to perform a method for detecting a fallen person. The method includes identifying a reference plane and a reference line in a designated space and monitoring the designated space using one or more range-controlled radars. These radars are coupled to one or more antennas configured to define fields of the one or more range-controlled radars to one or more portions of the designated space, where at least one portion corresponds to the reference plane. The range-controlled radars detect presence of one or more parameters corresponding to a subject disposed in the designated space. The one or more parameters, for example, include one or more physiological parameters and one or more motion parameters. The range-controlled radars then identify the subject as the fallen person if the one or more physiological parameters corresponding to the subject are detected proximate the reference plane.

DRAWINGS

These and other features, aspects, and advantages of the present technique will become better understood when the following detailed description is read with reference to the accompanying drawings in which like characters represent like parts throughout the drawings, wherein:

FIG. 5 is an exemplary state decision chart for inferring the state of a subject disposed in a designated space using variables representing the motion and respiration signal data received from one or more radars;

Figure 7A:
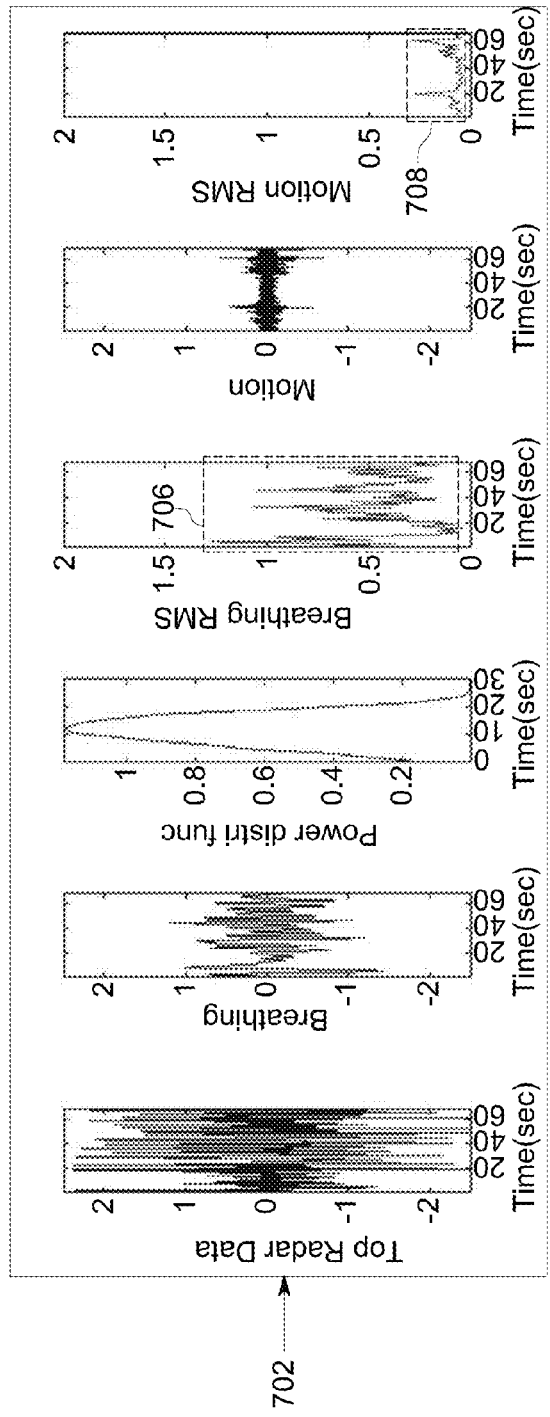
Figure 7B:
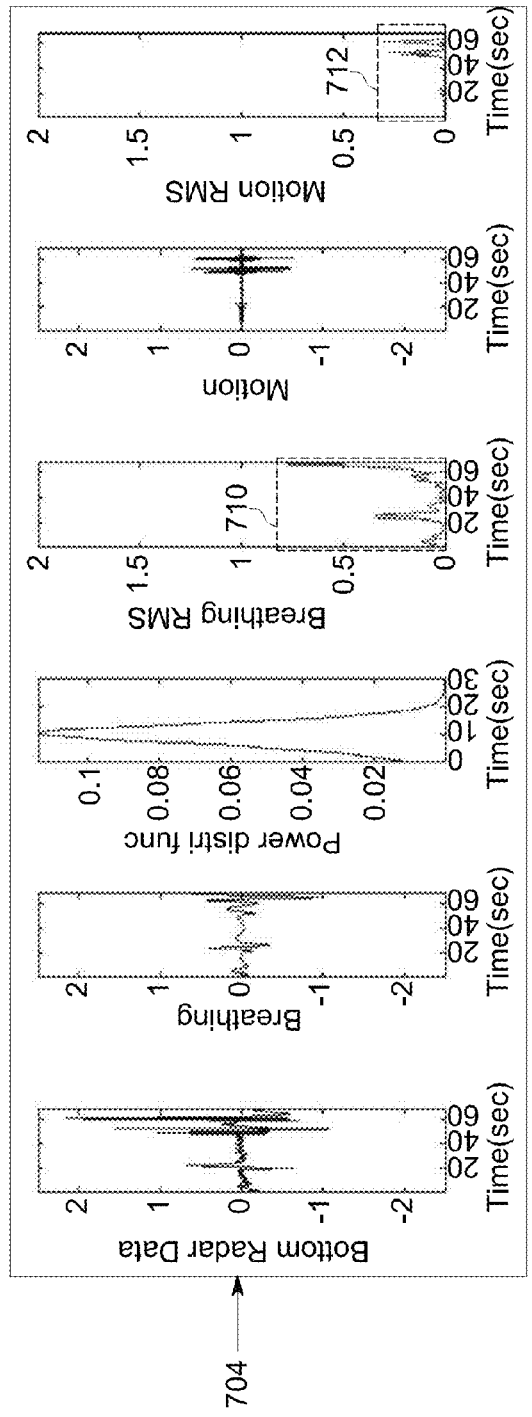

FIGS. 7A and 7B are graphical representations illustrating an example of signals received from top and bottom radars, respectively, and corresponding to a subject in an alternative position, in accordance with aspects of the present technique; and FIGS. 8A and 8B are graphical representations illustrating an example of signals received from top and bottom radars, respectively, and corresponding to a subject in another position, in accordance with aspects of the present technique.

DETAILED DESCRIPTION

The following description presents systems and methods for monitoring a subject such as a person in a desired space. Particularly, certain embodiments illustrated herein describe inexpensive yet efficient systems and methods for detecting a fallen person using one or more range-controlled RADAR (Radio Detection and Ranging) systems. As used herein, the term "range-controlled" RADAR refers to a radar that limits an associated transmit interval and/or a receive interval in order to process only those signals that are received by a corresponding antenna from a designated radial range. Although the present systems describe use of range-controlled RADAR circuitry, the systems may include any other suitable type of motion sensing devices, such as electromagnetic, acoustic or optical measurement devices, for use in different operating environments for detecting a fallen person. An exemplary environment that is suitable for practicing various implementations of the present systems and methods is described in the following sections with reference to FIG. 1.

Figure 1:
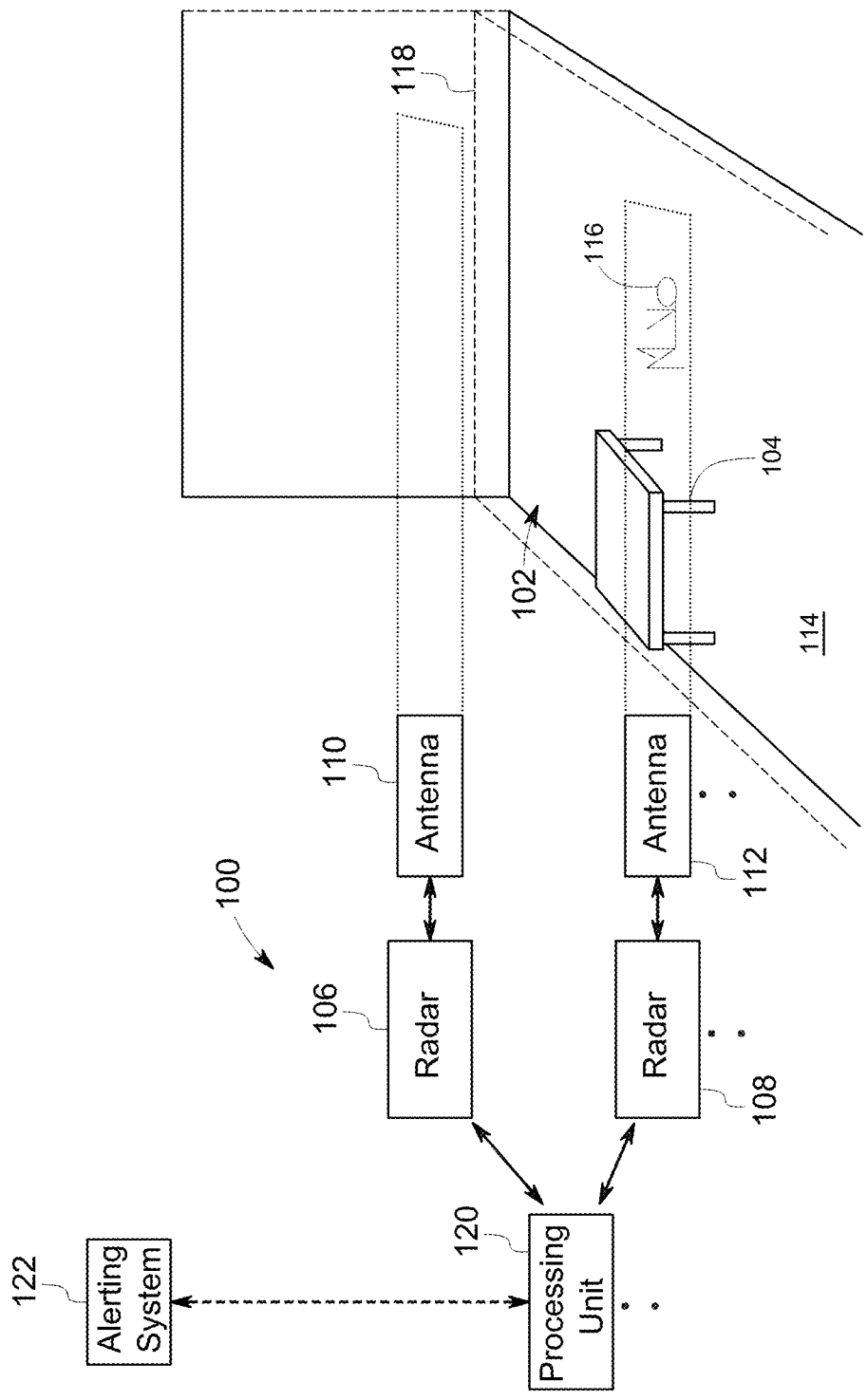
FIG. 1 is a block diagram of an exemplary system for detecting a fallen person, in accordance with aspects of the present system.

FIG. 1 illustrates an exemplary fall detection (FD) system 100 for monitoring a designated space 102, such as a room in an assisted living facility, for detecting human fall events. The designated space 102, for example, includes one or more objects 104, such as chairs, beds, tables, columns and cupboards disposed in one or more portions of the designated space 102. In certain scenarios, these objects 104 obstruct the direct line-of-sight between the FD system 100 and one or more portions of the designated space 102.

Accordingly, the FD system 100 includes radar systems 106, 108 coupled to antennas 110, 112, respectively for monitoring the designated space 102 for human fall events. An advantage of using radar systems 106, 108 for fall detection as opposed to using video-based FD systems includes the ability to provide operational capability even in the presence of certain obstructions in the designated space 102. To that end, the radar systems 106, 108 include suitable devices such as microwave impulse radar ("MIR"), range-controlled radar ("RCR"), impulse radio and microwave Doppler devices that are appropriately range-gated to detect human or animal motion within the designated space 102.

In certain embodiments, the radar systems 106, 108 are calibrated for optimal performance by establishing range settings according to the shape and size of the designated space 102. In one implementation, for example, the radar systems 106, 108 allow selection from a plurality of range settings, such as about 9 feet, 18 feet, 27 feet, and 35 feet. It should be noted that although FIG. 1 depicts the FD system 100 with two radar systems 106, 108, each radar system having one antenna, the FD system 100, in one example, employs more than one antenna with each of the radar systems 106, 108. In another example, there are more than two radar systems each having at least one antenna. In a further example, the FD system 100 employs a single radar system with one or more antennas focused over desired portions of the designated space 102.

Further, unlike other conventional microwave sensors that may erroneously detect subjects in adjoining areas, selection of a desired range setting allows the radar systems 106, 108 to detect subjects only within the designated space 102, while ignoring subjects, for example, in an adjacent room or outside. Particularly, in one embodiment, the radar systems 106, 108 transmit electromagnetic signals towards desired portions of the designated space 102 and sense corresponding echo signals reflected from objects 104, persons and/or animals disposed in the designated space 102. More particularly, the radar systems 106, 108 employ pulse sequences that are sensitive to physiological motion. In one embodiment, for example, the radar systems 106, 108 transmit two pulses at a high repetition rate (on the order of 5 MHz) for a carrier in the 5.8 GHz ISM band for monitoring the designated space 102.

The radar systems 106, 108 receive signals reflected from subjects in the designated space 102 and use the received signals to determine one or more properties of the subject such as velocity, size and/or geometry of the subject. By way of example, a time or a phase delay between the transmitted and received signals is used to determine a distance to the subject disposed in the designated space 102. Further, a frequency shift, phase difference and/or time difference ascertained using the received signals enables calculation of the subject's velocity, whereas the strength of the signal allows determination of the subject's radar cross section. The determined cross section, in turn, provides information about the subject's size, geometry, and composition that may be used to determine if the subject disposed in the designated space 102 corresponds to a person.

To that end, the radar systems 106, 108 are appropriately positioned in the designated space 102 to effectively monitor one or more desired portions of the designated space 102 for detecting fall events. In one embodiment, at least one of the radar systems 106, 108 is positioned in the lower portion of the designated space 102. For example, the radar systems 106, 108 can be coupled or integrated into the lower portion of one or more of the walls or otherwise disposed to monitor the lower portion of the designated space 102. In certain embodiments, one or more additional radar systems may be positioned in the upper portion of the wall or disposed to monitor the upper portion of the designated space 102 to rule out false positives and enable a more accurate assessment of human fall events in the designated space 102.

In a further embodiment, the radar systems 106, 108 are approximately positioned on the ceiling of the room for monitoring a large portion of the designated space 102. By way of example, the radar subsystems 106, 108 can be approximately positioned at the center of the ceiling of a room. In other examples, the radar systems 106, 108 can be positioned under a bed or on a wall adjacent to a staircase that allows for the field of view of the radar systems 106, 108 to include regions where a risk associated with a potential fall event may be high.

Although FIG. 1 illustrates two radar systems 106, 108, and two antennas 110, 112, as previously noted, fewer or more radar systems and antennas may be employed to monitor areas of different sizes. In one implementation, for example, a single radar coupled to an antenna that successfully constrains the radar signal close the floor identifies a subject as the fallen person 116 upon detecting presence of motion and physiological parameters corresponding to the subject close to floor. In another implementation, the single radar employs a passive infrared (PIR) motion sensor for additionally monitoring desired portions above the floor to assess fall events more accurately and cost effectively. Alternatively, the single radar quickly switches between two or more antennas 110, 112 to detect human fall events in different portions, such as from a bed or near the door, of the designated space 102, while reducing false alarms. In certain other implementations, however, the multiple radar systems may operate independently or be communicatively coupled through wired and/or wireless links to each other and/or a central health monitoring system for communicating alerts and other information regarding potential fall events detected in the designated space 102.

Accordingly, in certain embodiments, the radar systems 106, 108 use planar antennas 110, 112, respectively to detect presence of motion and/or physiological parameters in desired portions of the designated space 102. The desired portions include, for example, regions where a risk associated with a potential fall event may be high. In one embodiment, presence of the physiological parameters in the desired portions is used to determine a position and/or health status of the individual. Particularly, in one exemplary implementation, the antennas 110, 112 detect presence of human heartbeats, respiration and/or motion close to a reference plane 114, such as the floor of the room to detect a fallen person 116.

To that end, a particular plane, for example, a substantially horizontal and/or flat plane in the designated space 102 is identified as the reference plane 114. In certain instances, the reference plane 114 is approximately parallel to a floor of a room or a designated space, while in other instances it is angled with respect to the floor. Additionally, a line corresponding to another substantially horizontal plane disposed at a particular height, for example 0.5 meters, above the reference plane 114 is identified as a reference line 118 in the designated space 102. The FD system 100, in one example, monitors portions both above and below the reference line 118 to more accurately ascertain the state of a target in the designated space 102 and minimize false alarms.

Accordingly, in certain embodiments, the height of the reference line 118 above the reference plane 114 is determined, for example, based on an average waist height of persons inhabiting the facility to distinguish between upper and lower-torso movements of a person in the designated space 102. Specifically, the height of the reference line 114 is selected so as to ensure that at least a portion of the low-risk movements such as a person lying on the bed (not shown), or in a kneeling position (not shown), or sitting in a chair (not shown) is detected above the reference line 114.

In one embodiment, for example, the antenna 110 is positioned to constrain the radar signals over a portion of the designated space 102 that extends from the reference plane 114 to about 12-24 inches above the reference plane 114. The planar antenna 110, thus, enables the FD system 100 to detect the presence of any physiological parameters close to the floor/reference plane 114 that may be indicative of the fallen person 116. By way of example, if a relative strength of respiration and/or heartbeat signals received from the antenna 112 disposed below the reference line 118 is greater than the respiration and/or heartbeat signals received form the antenna 110 disposed above the reference line 118, the subject's chest cavity is assumed to be close to the floor/reference plane 114. Accordingly, in one embodiment, the FD system 100 determines the subject to be the fallen person 116 disposed on the floor/reference plane 114. Particularly, the FD system 100 employs the antenna 110 that constrains the radar signals over a portion of the designated space 102 extending from the plane corresponding to the reference line 118 to about 24 inches height above the reference line 118 to detect the presence of physiological parameters indicative of a presence of a human in a standing or sitting position in the designated space 102.

The FD system 100, in certain embodiments, further employs one or more processing units 120 coupled to the radar systems 106, 108 to ascertain one or more properties of a subject disposed in the designated space 102 based on the reflected radar signals. Although FIG. 1 illustrates the processing unit 120 as a separate entity, in certain embodiments, the radar systems 106, 108 may include circuitry that provides the functionality of the processing unit 120. Further, in certain embodiments, either a single processing unit processes data received from multiple radar systems, or each radar system may be associated with its own processing unit. Additionally, the processing unit 120 is coupled via wired and/or wireless network connections (not shown) to the radar systems 106, 108 for receiving and/or processing the reflected radar signals for detecting human fall events.

In one embodiment, for example, the processing unit 120 filters the reflected radar signals to extract motion, heartbeat and respiration data into signal frames based on their corresponding frequency band characteristics. In particular, the processing unit 120 evaluates data received from radar systems 106, 108 disposed above and below the reference line 118, respectively to detect features such as presence of motion, heartbeat and respiration in upper and lower portions of the designated space 102. If, for example, the evaluation indicates presence of motion, heartbeat and/or respiration only proximate the reference plane 114, the processing unit 120 identifies the subject to be the fallen person 116.

Additionally, the processing unit 120 generates an output upon identifying the subject as the fallen person 116 in the designated space 102. In one embodiment, the processing unit triggers an alert through an alerting system 122 coupled to the radar systems 106, 108 and/or the processing subsystem 120. The alerting system 122, for example, generates an audio output and/or a visual output such as flashing lights, display messages and/or an alarm. Additionally, the alerting system 122 can also sound an alarm, send a voicemail, text message and/or email to a mobile device of appropriate personnel and/or to another monitoring system through a wired and/or wireless link.

Thus, unlike conventional monitoring applications where determining fall events require complicated computations and expensive equipment, the processing subsystem 120 employs simple yet robust computations for detecting fall events. Specifically, in one embodiment, the processing subsystem 120 detects the fallen person 116 by detecting the presence of one or more physiological parameters proximate the floor of the room using the range-controlled radar systems 106, 108. In certain embodiments, the FD system 100 monitors both motion of the subject, such as detecting a person as they are falling, as well as the physiological parameters that are processed to assess the health status of the fallen person 116.

Additionally, the processing unit 120 evaluates reflected signal data for fall detection as opposed to using an entire image of the fallen person 116 used in conventional video-based FD applications. Employing the radar signal data, thus, eliminates the need to store images and/or other personally identifiable information in the FD system 100, thus mitigating privacy concerns. Moreover, use of the range-controlled radar systems 106, 108 enables detection of the fallen person 116 even when the objects 104 disposed in the designated space 102 obstruct the line-of-sight view to the fallen person 116. The structure and functioning of an exemplary FD system for monitoring a designated space and detecting human fall events, in accordance with aspects of the present technique, will be described in greater detail with reference to FIGS. 2-3.

Figure 2:
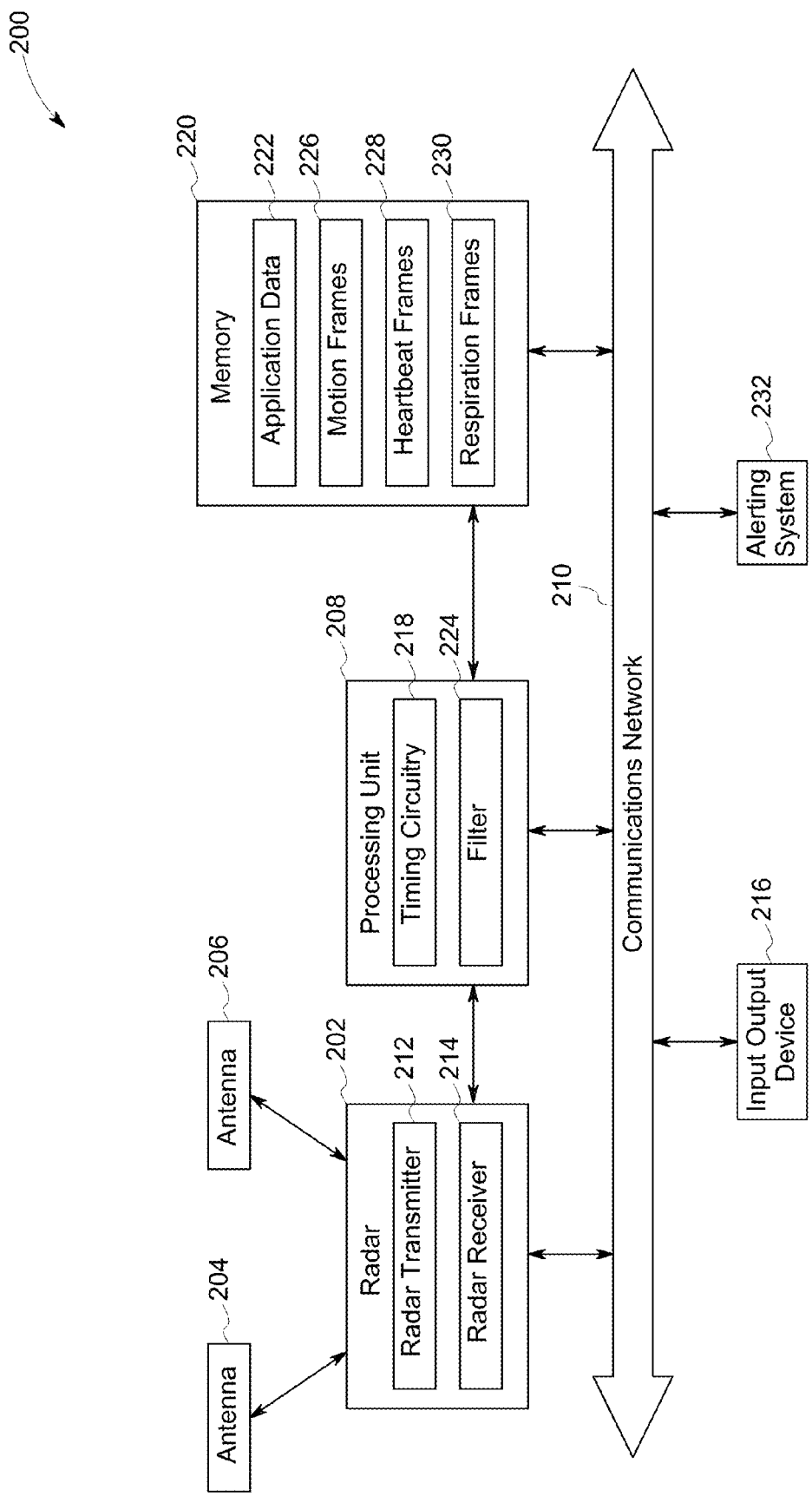
FIG. 2 is a block diagram of another exemplary system for detecting the fallen person, in accordance with aspects of the present system.

FIG. 2 illustrates a FD system 200, similar to the FD system 100 of FIG. 1, for monitoring and detecting fallen persons in a designated space. For discussion purposes, the FD system 200 is described with reference to the elements of FIG. 1. In one embodiment, the FD system 200 includes a range-gated radar 202 coupled to one or more planar antennas 204, 206 and one or more processing units 208 over a communications network 210. To that end, the communication network 210 includes, for example, wired networks such as LAN and cable, and/or wireless networks such as WLAN, cellular networks, satellite networks, and short-range networks such as ZigBee wireless sensor networks. In particular, the communication network 210 allows transmission of signal data received by the radar 202 to the processing unit 208 for further processing and evaluation.

As previously noted, the radar 202 transmits electromagnetic signals and senses the echo from reflecting subjects in the designated space 102, thus gaining information about the subjects. Accordingly, the radar 202, for example, includes a transmitter 212 and a receiver 214. The transmitter 212 generates and amplifies a signal waveform to a required transmission power. Optionally, the transmitter 212 filters the signal before transmission to prevent inclusion of any extraneous signals. Additionally, the antenna 204 focuses the radar signal transmitted by the transmitter 212 over a desired portion of the designated space 102. To that end, the antenna 204, for example, includes a dipole antenna, a patch antenna, a parabolic antenna or any antenna that provides directivity. Specifically, in one embodiment, the antenna 204 is a directional antenna that focuses the radar signal over the desired portion, for example, the reference plane 114 in the designated space 102.

Further, the receiver 214 receives and processes the radar signals reflected from the objects 104 in the designated space 102 for further use. The receiver 214, for example, converts the signal from the transmission frequency to an intermediate or baseband frequency, segregates the signal information from noise and interference, and/or appropriately amplifies the signal for digitization and/or display. In certain embodiments, the processing unit 208 evaluates the presence of a fallen person in the designated space 102 using the signals received and/or processed by the receiver 214. In particular, the processing unit 208 evaluates the signals reflected from moving subjects or surfaces, for example, a chest wall proximate the reference plane 114 to detect the fallen person 116.

As previously noted, the reference plane 114 corresponds to portion of the designated space 102 where a risk associated with a fall event is high. Accordingly, in certain embodiments, the reference plane 114 corresponds to the floor of a room, a bed disposed in the room, or any other suitable plane in the designated space 102. In one embodiment, a plane disposed furthest from the radar 202 on an axis substantially perpendicular to the radar 202 is identified as the reference plane 114. Alternatively, a plane at a determined distance from the radar 202 may be designated to be the reference plane 114. Additionally, in embodiments where the radar 202 is mounted on a sidewall adjacent to a staircase or stairwell, the reference plane 114 is derived to generate a relative reference plane, an angled reference plane, or a plurality of reference planes such as in relation to a corresponding number of stairs.

The antenna 204 focused over the reference plane 114, thus, allows detection of subjects disposed close to a high fall risk portion of the designated space 102. In certain embodiments, however, another antenna 206 may be positioned in the designated space 102 so as to focus the radar signal above the reference line 118 to capture upper torso motions of a person. In certain embodiments, positions of the reference plane 114 and the reference line 118 may be pre-programmed into the FD system 100. Alternatively, the FD system 100 may include an input-output device 216, such as a graphical user interface (GUI), to allow a user to provide positional information corresponding to the reference plane 114 and the reference line 118.

Further, unlike FIG. 1 that illustrates two radar systems each coupled to a different antenna, FIG. 2 illustrates an embodiment where a single radar 202 is coupled to two antennas 204, 206. Here, the radar 202 multiplexes back and forth between the two antennas 204, 206 to capture data corresponding to different portions of the designated space 102. The processing unit 208 evaluates the signals received from both the antennas 204 and 206 after accounting for the time lag between the data captured by the antennas 204, 206.

To that end, the processing unit 208 includes timing circuitry 218 to determine the time lag between data acquisition events corresponding to the signal transmissions by the antennas 204, 206. The processing unit 208 then uses the signal evaluation to rule out false-positive events, for example, triggered by a pet in the designated space 102, a person lying on the bed, or in a kneeling position and/or sitting in a chair. Accordingly, processing unit 208 includes one or more microprocessors, microcomputers, microcontrollers, and so forth, for evaluating the reflected signal data received by the radar 202.

The processing unit 208, in certain embodiments, further includes a data repository or memory 220 such as RAM, ROM, disc drive or flash memory to store the received radar signals, evaluated signal data, positions of the reference plane 114 and the reference line 118 as application data 222. Additionally, the processing unit 208, in certain embodiments, may determine and store positions and/or physiological parameters of objects 104 disposed in a default configuration of the designated space 102 in the memory 220 as part of application data 222. The processing unit 208 may then use the stored positions to detect any additional subjects disposed proximate the reference plane 114 that may be indicative of potential fall events.

Generally, presence of physiological parameters in the specified frequency ranges is considered indicative of presence of a person or animal in the designated space 102. Accordingly, in one embodiment, the processing unit 208 extracts physiological parameters such as motion, heartbeat and respiration data from the reflected radar signals. To that end, the processing unit 208 includes, for example, a filter element 224 that generates a signal frame of a particular time duration from the reflected radar signals. In one embodiment, the filter element 224 generates motion frames 226, heartbeat frames 228 and respiration frames 230 from the received radar signals based on corresponding frequency band characteristics.

By way of example, the filter element 224 generates the motion or high band frame corresponding to a signal of about 4 Hz to about 10 Hz, the heartbeat or mid band frame corresponding to a signal of about 1 Hz to about 2 Hz, and the respiration or low band frame corresponding to a signal just above 0.1 Hz to about 0.5 Hz. Accordingly, in certain embodiments, the filter element 224 includes low pass and/or band pass filters to extract the motion frames 226, the heartbeat frames 228 and the respiration frames 230 from each signal frame.

In certain embodiments, the processing unit 208 may extract statistical, spectral and/or temporal features such as a minimum, maximum, average and root mean square (RMS) values of amplitude and/or frequency associated with the motion frames 226, the heartbeat frames 228 and the respiration frames 230. The processing unit 208 then uses the features extracted from these frames for detecting a potential fall event. In one embodiment, the average frequency features are used to provide estimates of the rates associated with the detected physiological parameter such as the rate of respiration and heartbeat rate, whereas the RMS amplitude features may be used to provide estimates of the strengths associated with the detected physiological parameter such as the depth of respiration or the degree of subject motion.

In one embodiment, the processing unit 208 uses the determined frequency and amplitude values to distinguish between a person and an animal present in the designated space 102. The processing unit 208, for example, may compare the evaluated motion, heartbeat and/or respiration values with corresponding threshold values for identifying the subject as the fallen person 116. The threshold values, for example, may be pre-programmed into the FD system 100 or may be provided by the user through the input-output device 216. In certain embodiments, the FD system customizes the threshold values over time for accurately distinguishing between a person and an animal moving in the designated space 102.

Upon determining the presence of a person in the designated space, the processing unit 208 further determines the state of the person based on whether the physiological parameters were detected proximate the reference plane 114, above the reference line 118, or in both these portions of the designated space 102. Particularly, in one embodiment, the processing unit configures the FD system 200 to monitor the desired portions for a determined duration of time, for example, 90 seconds. Generally, the determined duration of time corresponds to a recovery time during which the person may get up subsequent to a fall. The processing unit 208, however, may vary the determined period of time based on other parameters such as a location of the fall and/or the presence of another person in the designated space 102. Alternatively, the determined duration of time may be based on user preferences and/or application requirements to ensure early detection of fall events.

In one embodiment, the processing unit 208 determines presence of one or more of the physiological parameters only above, or both above and below the reference line 118 for more than the determined duration of time as being indicative of a standing or sitting person. The processing unit 208, however, determines the presence of one or more of motion, heartbeat and respiration only below the reference line 118 for more than the determined duration of time as being indicative of the fallen person 116 and generates an alert through an alerting system 232 coupled to the processing unit 208 and/or the radar 202.

In certain embodiments, the processing unit 208 may further determine a rate and an energy associated with the signals corresponding to the detected physiological parameters for more accurately assessing the state of the fallen person 116. By way of example, the processing unit 208 monitors the fallen person 116 to determine if there is a reduction in the heartbeat and respiration rates of the fallen person 116. In one embodiment, the processing unit 208 employs more complex state estimation techniques for determining a state of the fallen person 116 and generates and/or communicates an alert to appropriate personnel or a healthcare monitoring system for immediate assistance. Specifically, the processing unit 208, upon determining a reduction in values of the physiological parameters out of their threshold limits, generates an audio output and/or a visual output such as flashing lights and/or an alarm through the alerting system 232. To that end, in certain embodiments, the alerting system 232 includes an alarm unit, an audio transmitter, a video transmitter, a display unit, or combinations thereof, to generate the audio output and/or the video output.

Additionally, the alerting system 232 generates and/or communicates an alert output signal through a wired and/or wireless link to appropriate personnel and/or another monitoring system to generate a warning or perform any other specified action. The specified action, for example, may include sounding an alarm, sending an alert message such as a voice message, text message and/or email to a mobile device coupled to the FD system 200 over the communications network 210. Furthermore, in certain embodiments, the FD system 200 may be implemented as a standalone system for monitoring designated spaces for fallen persons. Alternatively, the FD system 200 may be implemented as part of a larger healthcare system for detecting the person 116 who may have experienced a fall event.

In certain embodiments, the FD system 200, for example, includes a PIR motion sensor (not shown) coupled to the radar 202 and/or the processing unit 208. The PIR motion sensor activates and/or deactivates the radar 202 based on presence or absence of motion in the designated space 102, thus saving power and reducing the RF signal transmission. Additionally, use of the range-controlled radar based FD system 200 allows use of inexpensive equipment that detects falls even in presence of obstructions. Moreover, determining fall events based on the presence of the physiological parameters determined using reflected radar signals allows for simple processing and mitigation of privacy concerns as no personally identifiable data is used. An exemplary method for efficiently detecting a fallen person in a designated space using range-controlled radar is described in greater detail with reference to FIGS. 3-8.

Figure 3:
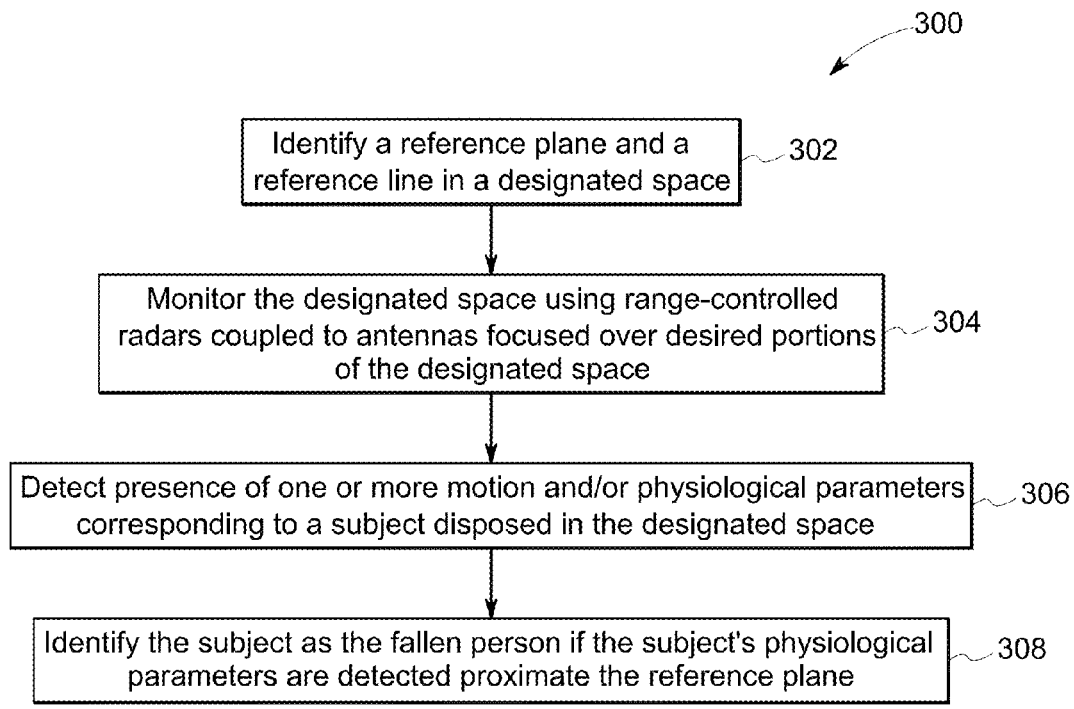
FIG. 3 is a flow chart illustrating an exemplary method for detecting a fallen person, in accordance with aspects of the present technique.

FIG. 3 illustrates a flow chart 300 depicting an exemplary method for detecting a fallen person using a range-controlled radar system. The exemplary method may be described in a general context of computer executable instructions on a computing system or a processor. Generally, computer executable instructions may include routines, programs, objects, components, data structures, procedures, modules, functions, and the like that perform particular functions or implement particular abstract data types. The exemplary method may also be practiced in a distributed computing environment where optimization functions are performed by remote processing devices that are linked through a communications network. In the distributed computing environment, the computer executable instructions may be located in both local and remote computer storage media, including memory storage devices.

Further, in FIG. 3, the exemplary method is illustrated as a collection of items in a logical flow chart, which represents operations that may be implemented in hardware, software, or combinations thereof. In the context of software, the blocks represent computer instructions that, when executed by one or more processing subsystems, perform the recited operations. The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method without departing from the spirit and scope of the subject matter described herein. For discussion purposes, the exemplary method is described with reference to the implementations of FIGS. 1-2.

In one embodiment, an FD system, such as the FD system 100, 200 of FIGS. 1-2, continually monitors a designated space to detect human fall events. To that end, the designated space, for example, includes a single hospital bed, a hospital ward, a room, or any other suitable area that can be monitored by the FD system. Further, the designated space, for example, includes one or more objects such as chairs, beds, tables, columns and cupboards that obstruct the direct line-of-sight between the FD system and one or more portions of the designated space. Accordingly, the FD system includes one or more range-controlled Doppler radars that can monitor and detect a fallen person in the designated space even in the presence of obstructions.

Generally, in the event of a fall, the fallen person is disposed supine on the floor of a room or stairs. Such areas, thus, are considered to be high fall-risk portions of the designated space and may be carefully monitored by the FD system. Accordingly, at step 302, a reference plane and a reference line in the designated space are identified. As previously noted, the reference plane corresponds to a high fall-risk portion of the designated space, for example, the floor of a room, a portion next to a bed disposed in the room, base of a staircase, or any other suitable plane in the designated space.

In one embodiment, a plane disposed furthest from the radar on an axis substantially perpendicular to the radar is identified as the reference plane. Alternatively, a plane at a determined distance such as about 2 meters from the radar may be designated to be the reference plane. Additionally, in embodiments where the radar is mounted on a sidewall adjacent to a staircase or stairwell, the reference plane is derived to generate a relative reference plane, an angled reference plane, or a plurality of reference planes such as in relation to a corresponding number of stairs.

Further, in certain embodiments, a line corresponding to a substantially horizontal plane at a desired height above the reference plane may be defined as the reference line. To that end, the height of the reference line above the reference plane may be determined, for example, based on an average waist height of persons inhabiting the facility. Specifically, the height of the reference line is selected so as to ensure that at least a portion of the low-risk movements such as a person lying on the bed or in a kneeling position or sitting in a chair is detected by the range-controlled radar above the reference line.

At step 304, the designated space is monitored using the range-controlled radar coupled to one or more antennas that are configured to constrain a field of the radar to one or more portions of the designated space, specifically the reference plane. In certain embodiments, a single radar multiplexing between antennas focused over portions above and below the reference line is used to monitor the designated space. In alternative embodiments, a plurality of radars coupled to one or more antennas focused over specific portions of the designated space may be employed for detecting the fallen person.

In one embodiment, the range-controlled radar transmits ultra-low power, very short duration pulses, for example of about 10 microseconds, at a radio frequency of about 5.8 gigahertz towards the desired portions of the designated space at selected time intervals, for example, every ten milliseconds. These pulses, although thousands of times weaker than those produced by a common cell phone or baby monitor, penetrate the clothing over the fallen person and reflect off of the torso to accurately detect micro movements associated with the heart, lungs and thorax portions of the body. As previously noted, in certain embodiments, the FD system includes PIR sensor that activates and/or deactivates the radar based on presence or absence of motion in the designated space to conserve power and reduce RF signal transmission. The radar then receives and communicates the reflected signals to a processing unit, such as the processing unit 208 of FIG. 2, coupled to the radar for further processing. In certain embodiments, the radar includes circuitry to store and process the reflected signals using embedded digital signal processing algorithms.

Accordingly, at step 306, the radar detects presence of one or more parameters corresponding to a subject disposed in the designated space. The physiological parameters include, for example, motion and vital signs such as heartbeat and respiration. Specifically, in one embodiment, the radar measures a "ballistogram" that corresponds to a motion transferred to the surface of the body of the subject due to motion inside the body. By way of example, during each heartbeat, the heart mechanically changes shape, pushing blood into the aorta and out to the arteries. Some of the motion caused by the beating heart appears on the surface of the body, particularly on the chest or thorax. Similarly, respiration causes the chest to expand or contract due to the contraction of the diaphragm and the subsequent filling of the lungs during breathing.

The radar detects and communicates the movement of the chest or thorax to the processing unit. The received signals may include some noise as the movement of other internal muscles may also generate a change on the body surface resulting in confusion in the ballistogram measurement. Moreover, the heartbeat and respiration signals may be superimposed over each other in the received signals. Accordingly, in certain embodiments, the processing unit processes the received signals to remove unwanted interference and noise, and then digitally separates, filters and processes the signals to a digital format that contains accurate heart and respiration rates and movement data.

Particularly, in one embodiment, the processing unit filters and samples the received signals to generates a signal frame of a particular duration of time. The processing unit then extracts the motion, heartbeat and respiration signal data from the generated signal frame based on their corresponding frequency band characteristics. Typically, the heartbeat rates vary, for example, from about 40 to about 95 beats per minute (about 0.7 to 1.6 Hz), while the respiration rates vary from about 5 to about 20 breaths per minute (about 0.1 to 0.3 Hz). Accordingly, in one embodiment, the processing unit employs a low-pass and/or band pass filters to separate motion, respiration and heartbeat data from the signal frame.

By way of example, the processing unit extracts a respiration frame of about 30 seconds from the signal frame generated from the received signals. Additionally, the processing unit generates heartbeat frames of about 10 seconds and motion frames of about 5 seconds from the signal frame. In one embodiment, for example, the processing unit employs a filter with a transition between ~0.70 Hz and ~0.35 Hz to isolate heartbeats from the signal frame. In certain instances, however, the heartbeat respiration and motion signals may overlap with each other in the received signals. Accordingly, the processing unit evaluates such frames at a more frequent rate, such as about every second. Further, in certain embodiments, the processing unit generates corrected frames by discarding the earliest 1 second and includes the most recent 1 second while keeping the total frame durations same.

The processing unit uses the motion, heartbeat and respiration frames to determine a position and state of the subject disposed in the designated space. Particularly, in one embodiment, the processing unit extracts statistical, spectral and/or temporal features such as pulse rate, respiration rate and associated energy from the filtered motion, respiration and heartbeat data. In certain embodiments, the processing unit determines if the detected physiological parameters correspond to an animal such as a pet or a human based on the determined frequency and energy data. Additionally, the processing unit determines if the physiological parameters were detected above the reference line, below the reference line or in both these portions of the designated space.

As previously noted, the reference plane and other portions below the reference line correspond to a high fall-risk portion of the designated space since presence of the physiological parameters below the reference line is generally indicative of a person bending, falling or supine on the floor. Accordingly, at step 308, the processing unit identifies the subject to be the fallen person upon detecting the presence of the one or more physiological parameters corresponding to the subject substantially below the reference line and/or proximate the reference plane. Particularly, the processing unit determines the subject to be the fallen person if the physiological parameters are detected below the reference line for more than a determined duration of time, such as 90 seconds. Generally, the determined duration of time corresponds to a recovery time during which the person may get up subsequent to a fall. The processing unit, however, may vary the determined period of time based on other parameters such as a location of the fall and/or the presence of another person in the designated space. Alternatively, the determined duration of time may be based on user preferences and/or application requirements to ensure early detection of fall events.

In certain embodiments, the FD system may additionally monitor the portions above the reference line to identify absence of upper torso motion to confirm the fall event. Further, the processing unit may direct the radar to continually monitor the physiological parameters to accurately assess a state of the fallen person. By way of example, the processing unit uses data received from further monitoring of the fallen person to determine if there is a reduction in the heartbeat and respiration rates of the fallen person. In one embodiment, the processing unit employs more complex state estimation techniques for determining a state of the fallen person and automatically generates and/or communicates an alert to appropriate personnel or a healthcare monitoring system for immediate assistance.

In one embodiment, for example, the FD system first detects a presence of motion in the designated space. Additionally, the processing unit determines if the motion is present above the reference line, below the reference line or in both these portions of the designated space. If no substantial motion is detected, the processing unit processes the received signals to determine the presence of micro-movements caused by physiological parameters, such as respiration and heartbeat in the designated space. In another embodiment, however, the processing unit configures the FD system to continually monitor presence of physiological parameters regardless of the motion state but evaluates the physiological parameters only when there is no motion. Such a scenario may be indicative of a person lying unconscious on the floor.

Thus, if the FD system detects presence of only heartbeat and/or respiration, the processing unit may generate an alarm to notify appropriate personnel or health monitoring system of a potential medical condition. In certain embodiments, the processing unit further estimates rates of the physiological parameters, for example, using Fast Fourier Transform (FFT) and auto-correlation analysis. The processing unit may also generate an alert if the rates of any of the physiological parameters are outside their acceptable threshold limits.

Typically, heartbeat and respiration rates for animals, specifically small pet animals such as cats and dogs, are greater than human heartbeat and respiration rates. Moreover, animal heartbeat and respiration signals have lower amplitudes as compared to corresponding human heartbeat and respiration signals. Accordingly, in one embodiment, the FD system individually learns specific threshold limits corresponding to each of the physiological parameters used to detect the presence of a fallen person in the designated space based on a known possession of a pet. Alternatively, these threshold limits may be pre-programmed into the FD system, or may be based on user input and/or application requirements.

Specifically, the processing unit, upon determining a reduction in values of the physiological parameters outside their threshold limits, generates an audio output and/or a visual output for alerting appropriate personnel and/or the associated health monitoring system. Generating the output, for example, includes flashing lights, sounding an alarm, sending an alert message such as a voice message, text message and/or email to a mobile device through an alerting system coupled to the FD system for soliciting assistance for the fallen person. In certain embodiments, however, the processing unit terminates the alert and restores the FD system to a default configuration upon detecting motion and/or determining an increase in values of the one or more parameters above their corresponding threshold limits.

The method disclosed herein, thus, allows for use of simple yet robust computations for monitoring and detecting fall events. Accordingly, standard-processing devices may be used for performing computations relevant to monitoring the designated space, thus reducing equipment cost and complexity. Specifically, the method allows detection of a fall event simply by detecting presence of physiological parameters such as heartbeat and respiration close to the floor of the room. The detection of the physiological parameters is greatly facilitated by the use of range-controlled radar coupled to one or more planar antennas. A few exemplary graphical representations of signals received from one or more radars, such as radar systems illustrated in FIGS. 1-2 and corresponding state estimation are described in greater detail with reference to FIGS. 4-7.

Figure 4:
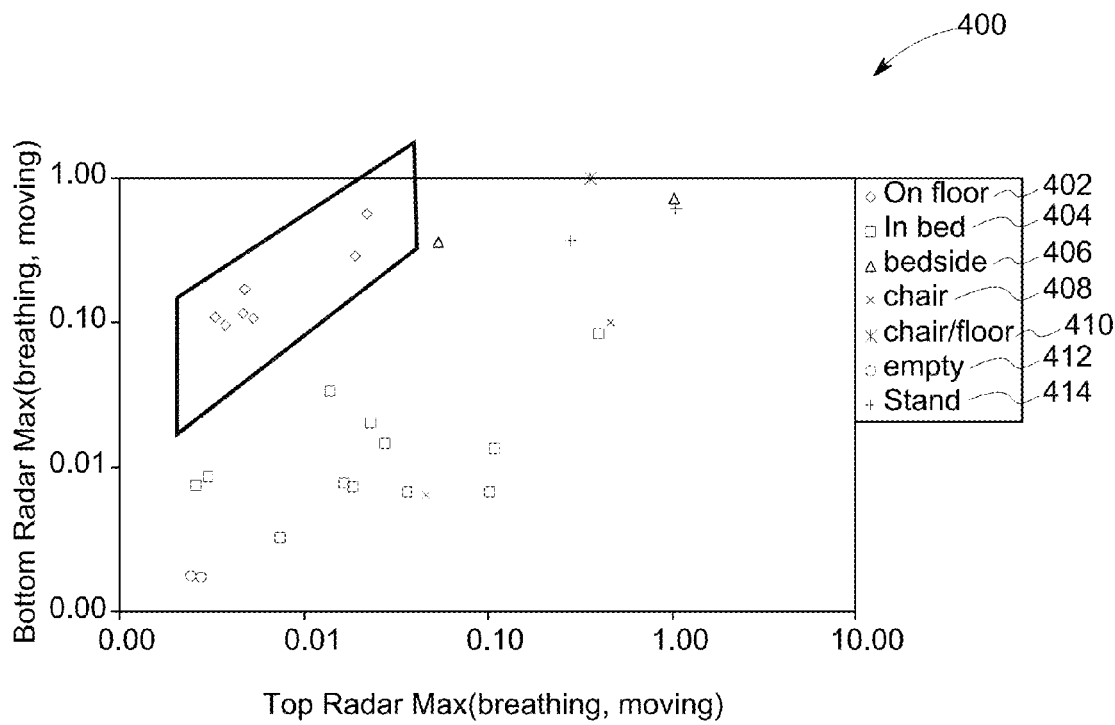
FIG. 4 is a graphical representation illustrating an example of clustered signals received from one or more radars.

FIG. 4 illustrates an exemplary graphical representation 400 of clustered signals received from the one or more radars illustrated in FIGS. 1-2. Particularly, in the graphical representation 400, the signals received by a radar system using one or more antennas focused above the reference line 118 are plotted along the X-axis, whereas the signals received by a radar system using one or more antennas focused below the reference line 118 are plotted along the Y-axis. It may be noted that the values plotted on the X and the Y-axes correspond to signals characterized by frequencies typically associated with respiration and motion of a human target.

In one embodiment, two range-controlled radars focused above and below the reference line, respectively transmit ultra-low power, very short duration pulses, for example of about 10 microseconds, at a radio frequency of about 5.8 gigahertz towards the desired portions of the designated space at selected time intervals, for example, every ten milliseconds. These pulses, although thousands of times weaker than those produced by a common cell phone or baby monitor, penetrate the clothing over the fallen person and reflect off of the torso to accurately detect micro movements corresponding to the movements associated with the heart, lungs and thorax portions of the body.

Typically, fall events will be indicated when the radar focused below the reference line (bottom radar) receives strong signals, while the radar focused on portions above the reference line (top radar) receives weak signals. Accordingly, the plotted values denoted by the element 402 represent a person supine on the floor. The plotted values denoted by the elements 404 and 406 represent signals received by the top and bottom radars that indicate substantially equal breathing and motion values, thus indicating that the person may be lying on a bed or is at the bedside. Additionally, element 408 represents signals received by the top and bottom radars that indicate activity above or close to the reference line, and hence, may be indicative of a person sitting in the chair and/or moving hands.

Further, the element 410 denotes plotted values corresponding to a strong signal received by the bottom radar and a slightly weaker signal received by the top radar. Accordingly, the element 410 may represent a scenario where the person is either sitting in a chair and moving legs or is supine and moving on the floor. Next, element 412 denotes plotted values corresponding to weak top and bottom signals, thus indicating an empty room, whereas element 414 represents strong top and bottom signals, indicating a standing and/or moving person. FIG. 4, thus, provides a graphical means to identify different positions and states of a person disposed in a designated space using the plotted data points corresponding to the signals received by the top and the bottom radars.

Additionally, FIG. 5 illustrates an exemplary state decision chart 500 that shows a correspondence between the state and/or position of the subject disposed in a designated space and the motion and respiration/breathing signal data received by the top and the bottom radars. More particularly, the state decision chart 500 shows the state and position of the subject based upon breathing and motion RMS values determined using signals received from both the top and bottom radars. In the state decision chart 500, "0" is used to represent signals indicating motion or respiration values that are below the corresponding threshold, while "1" is used for indicating presence of motion or respiration values that are above the corresponding threshold. The motion and breathing signal data received by the top and the bottom radars for some of the states denoted by the state decision chart 500 are illustrated in FIGS. 6-8.

Specifically, FIGS. 6-8 illustrate graphical representations depicting readings of signals corresponding to a person in different states or positions received by one or more radars, such as radars illustrated in FIGS. 1-2. In FIGS. 6-8, at least one of the radars (bottom radar) was coupled to an antenna that constrained the field of view of the radar below the reference line 118 or towards the reference plane 114 in the designated space 102. Additionally, another radar (top radar) was coupled to an antenna that constrained the field of view of the radar above the reference line 118 in the designated space 102. The top and the bottom radars, together, acquired signal data corresponding to various physiological parameters of the person disposed in the designated space and generated corresponding readings. In particular, the readings included, for example, radar data, power distribution function, breathing data, breathing RMS data, motion data and motion RMS data determined from signals received by top and bottom radars.

In particular, FIGS. 6-8 illustrate radar data corresponding to the output of the top and bottom radars, breathing data obtained from framed and filtered respiration frames, a power distribution function corresponding to the illustrated readings and breathing RMS data determined by extracting the root-mean-squared value of the breathing data. Additionally, FIGS. 6-8 also illustrate motion data computed from framed and filtered motion frames and motion RMS values determined by extracting the root-mean-squared value of the motion frames.

Figure 6A:
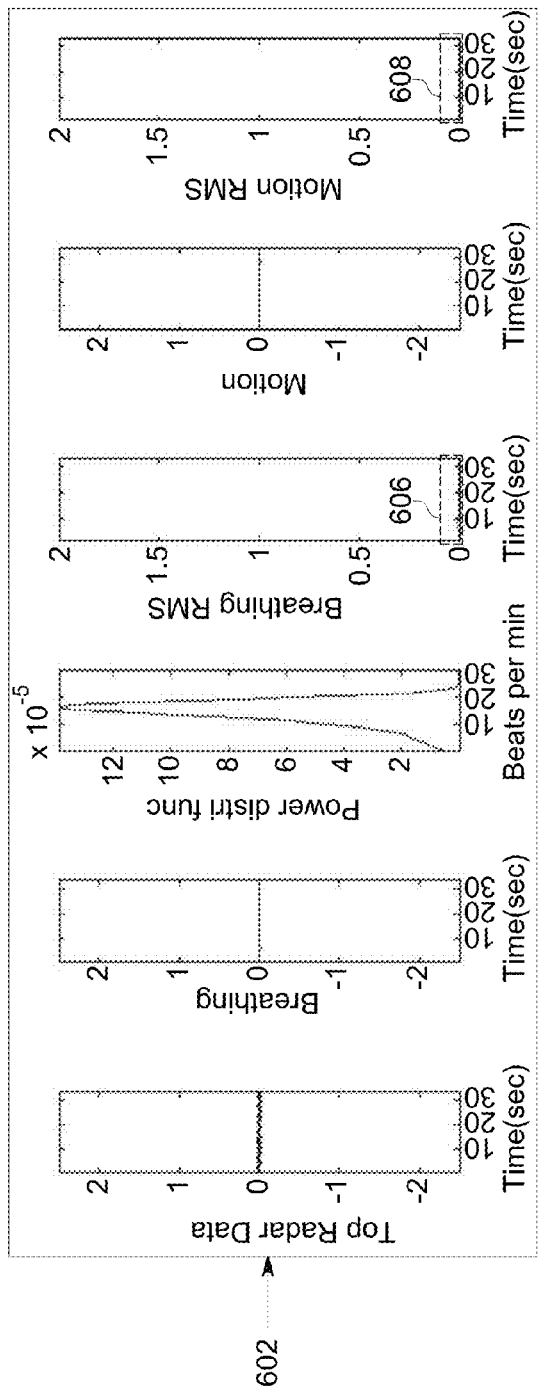
FIGS. 6A and 6B are graphical representations illustrating an example of signals received from top and bottom radars, respectively, and corresponding to a subject in a first position, in accordance with aspects of the present technique.
Figure 6B:
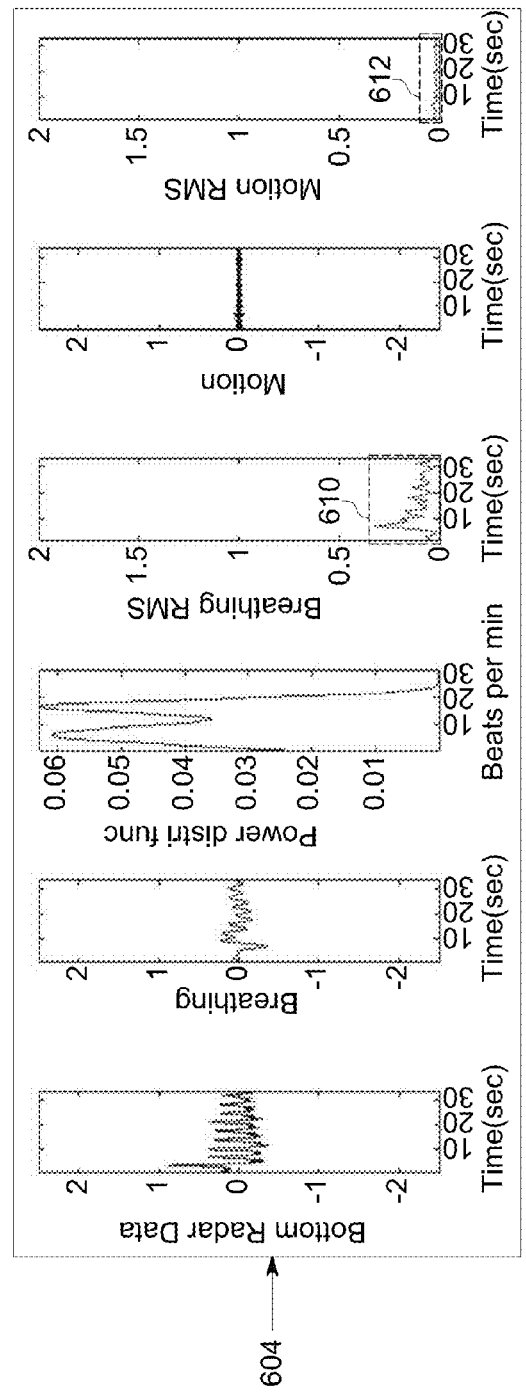

FIGS. 6A and 6B are graphical representations illustrating readings generated in lieu of signals received from the top and bottom radars when a subject was disposed in a first position. The readings illustrated in FIGS. 6A and 6B correspond to state 3 depicted in the state decision chart 500 of FIG. 5 that indicates a person supine and still on the floor. Specifically, FIG. 6A depicts the readings 602 generated using the top radar, whereas FIG. 6B depicts the readings 604 generated using the bottom radar. Particularly, in FIG. 6A, the readings 602 generated by the top radar depict breathing RMS value 606 and motion RMS value 608 to be zero, thus indicating an absence of breathing and motion above the reference line 118.

Further, in FIG. 6B, the readings 604 generated by the bottom radar depict non-zero breathing RMS value 610 and negligible motion RMS value 612 indicating the presence of physiological parameters below the reference line 118. The FD system, in one embodiment, determined absence of the physiological parameters above the reference line 118 and presence of only the breathing parameters below the reference line as being indicative of a fall event or a person supine and still on the floor. In such a scenario, the FD system generated and communicated an alert to appropriate personnel and/or an associated health monitoring system.

FIGS. 7A and 7B are graphical representations illustrating readings generated in lieu of signals received from the top and bottom radars when a subject is disposed in the designated space in an alternative position. Here, the alternative position may correspond to any of the states 13-16 depicted in the state decision chart 500 of FIG. 5 based on the threshold limits associated with the determined physiological parameters. Accordingly, the readings illustrated in FIGS. 7A and 7B may correspond to a person in a sitting or standing position, a person sitting and moving legs or a human and animal with either or both moving.

FIG. 7A, depicts the readings 702 generated using this top radar, whereas FIG. 7B depicts readings 704 generated using the bottom radar. Particularly, in FIG. 7A, the readings 702 generated by the top radar depict non-zero breathing RMS value 706 and motion RMS value 708 indicating presence of a standing or a sitting person. In FIG. 7B, the readings 704 generated by the bottom radar, however, also depict non-zero breathing RMS value 710 and motion RMS value 712. Typically, a person in a standing position would not exhibit breathing below the reference line 118. Accordingly, the FD system determined presence of the physiological parameters and motion both above and below the reference line 118 as being indicative of a person in a sitting position having upper torso motion and minor leg motion.

Further, FIGS. 8A and 8B are graphical representations illustrating readings generated in lieu of signals received from the top and bottom radars when a subject is disposed in the designated space in another position. In particular, the readings illustrated in FIGS. 8A and 8B correspond to a person seated in a chair, falling, struggling to get up and finally getting up.

FIG. 8A depicts readings 802 generated using the top radar, whereas FIG. 8B depicts readings 804 generated using the bottom radar. In FIG. 8A, the readings 802 generated by the top radar depict two separate segments of non-zero breathing RMS values 806, 808 and motion RMS values 810, 812. Further, in FIG. 8B, the readings 804 generated by the bottom radar also depict two separate segments of non-zero breathing RMS values 814, 816 and motion RMS values 818, 820.

Additionally, FIGS. 8A and 8B also depict that the top and bottom radars capture the two segments of non-zero breathing RMS and motion RMS values during different time periods. The FD system, in fact, detected presence of breathing and motion above the reference line, followed by breathing and motion below the reference line and finally again above the reference line. Accordingly, the FD system, determined presence of distinct breathing and motion segments both above and below the reference line 118 captured by the top and bottom radars at different time periods as being indicative of a person originally in a sitting position, who was falling, struggling to get up, and finally was seated again. As the person returned to a low-risk position within a designated time period, the FD system did not generate any alerts. In an alternative embodiment, the FD system terminates a previously generated alert.

The FD systems and methods disclosed hereinabove, thus, provide a non-contact yet efficient technique for detecting a fallen person. In particular, the FD systems employ fast and simple computations for detecting fall events and estimating a state of the fallen person to generate an appropriate alert or warning. Accordingly, standard-processing devices may be used for performing computations relevant to monitoring the field of view, thereby reducing equipment cost and complexity. Further, the FD system allows detection of a fall event simply by detecting presence of physiological parameters close to a high-risk area in the monitored space. The detection of the physiological parameters is greatly facilitated by the use of range-controlled radar that can penetrate through most obstructing objects in the field of view of the FD system. Moreover, employing the range-controlled radars eliminates the need to store images and/or other personally identifiable information, thus mitigating privacy concerns.

Although the exemplary embodiments of the present system disclose the use of range-controlled radar circuitry, use of any other suitable type of motion sensing devices, such as electromagnetic, acoustic or optical measurement devices for detecting a fallen person is also contemplated.

Furthermore, the foregoing examples, demonstrations, and process steps such as those that may be performed by the processing units 120, 208 may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to Python, C++ or Java. Such code may be stored or adapted for storage on one or more tangible, machine readable media, such as on data repository chips, local or remote hard disks, optical disks (that is, CDs or DVDs), or other media, which may be accessed by a processor-based system to execute the stored code.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for detecting a fallen person, comprising:
    identifying a reference plane and a reference line in a designated space;
    monitoring the designated space using one or more range-controlled radars coupled to one or more antennas are configured to define corresponding fields of the one or more range-controlled radars to one or more portions of the designated space, wherein at least one of the one or more portions corresponds to the reference plane;
    detecting presence of one or more parameters corresponding to a subject disposed in the designated space using the one or more range-controlled radars, wherein the one or more parameters comprise one or more physiological parameters and one or more motion parameters;
    identifying the subject as the fallen person if the one or more physiological parameters corresponding to the subject are detected proximate the reference plane;
    continually monitoring the one or more physiological parameters corresponding to the fallen person;
    generating an audio output, a visual output, an alert message, or combinations thereof, upon determining a reduction in values of the one or more parameters corresponding to the fallen person below corresponding threshold values; and
    terminating the audio output, the visual output, the alert message, or combinations thereof, upon determining a change in the values of the one or more parameters corresponding to the fallen person such that the changed values fall within the corresponding threshold values.

2. The method of claim 1, further comprising generating an audio output, a visual output, an alert message, or combinations thereof, upon determining that subject disposed in the designated space is the fallen person.

3. The method of claim 1, further comprising generating an audio output, a visual output, an alert message, or combinations thereof, upon determining that the fallen person has been disposed proximate the reference plane for more than a specified duration of time.

4. The method of claim 1, wherein defining the reference plane and the reference line in the designated space comprises:
    identifying a particular plane in the designated space as the reference plane; and
    designating a line corresponding to a substantially horizontal plane disposed at a desired height above the reference plane as a reference line in the designated space.

5. The method of claim 4, further comprising positioning at least one of the one or more range-controlled radars below the reference line.

6. The method of claim 5, further comprising positioning at least one of the one or more range-controlled radars above the reference line.

7. The method of claim 1, wherein determining one or more parameters corresponding to the subject disposed proximate the reference plane comprises:
    receiving one or more signals using the one or more range-controlled radars;

processing the received signals to extract components corresponding to one or more frequency bands, wherein each frequency band corresponds to a particular physiological parameter; and determining one or more characteristics corresponding to the one or more physiological parameters based on the corresponding frequency band components.

8. The method of claim 7, wherein determining the one or more physiological parameters comprises detecting at least one of:

a presence of one or more of a heart beat, respiration and motion corresponding to the subject disposed proximate the reference plane;

a position of one or more of the detected motion, the detected respiration and the detected heart beat in the designated space; and a duration of the presence of one or more of the detected motion, the detected respiration and the detected heart beat using at least one range-controlled radar, wherein at least one of the antennas is configured to constrain the field of the range-controlled radar to one or more desired positions of the reference plane.

9. The method of claim 8, determining the one or more physiological parameters comprises differentiating between the fallen person and an animal in the desired space based the one or more characteristics corresponding to the detected heart beat, the one or more characteristics corresponding to the detected respiration, one or more motion parameters or combinations thereof.

10. The method of claim 8, wherein the one or more characteristics corresponding to the detected heartbeat comprise a maximum frequency, a minimum frequency, an average frequency, energy associated with the heartbeat, or combinations thereof.

11. The method of claim 8, wherein the one or more characteristics corresponding to the detected respiration comprise a maximum frequency, a minimum frequency, an average frequency, energy associated with the respiration rate, or combinations thereof.

12. The method of claim 8, wherein the one or more motion parameters comprise duration of motion, time of motion, energy associated with the determined motion, or combinations thereof.

13. The method of claim 8, further comprising generating an audio output, a visual output, an alert message, or combinations thereof, upon detecting the presence of at least one of the heart beat and the respiration, and a presence or an absence of motion proximate the reference plane for more than a determined duration of time.

14. The method of claim 8, further comprising:

differentiating between an animal present in the desired space and the fallen person based on one or more characteristics corresponding to the detected heart beat, the detected respiration, the detected motion, or combinations thereof; and generating an audio output, a visual output, an alert message, or combinations thereof, upon detecting the presence of at least one of the heartbeat and the respiration corresponding to the fallen person, and a presence or an absence of motion corresponding to the fallen person proximate the reference plane for more than a determined duration of time.

15. A system for detecting a fallen person, comprising:

one or more range-controlled radars positioned at one or more positions in a designated space, said range-controlled radars configured to transmit a radar signal and receive a reflected radar signal from one or more subjects disposed in the designated space;

one or more antennas coupled to the range-controlled radars such that the one or more antennas are configured to define corresponding fields of the one or more range-controlled radars to one or more portions of the designated space, wherein at least one of the portions corresponds to a reference plane disposed below a reference line in the designated space;

a processing unit communicatively coupled to the one or more range-controlled radars such that the processing unit is configured to:

identify the reference plane and the reference line disposed in the designated space;

determine one or more parameters corresponding to the subjects proximate the reference plane using the reflected radar signal, wherein the one or more parameters comprise one or more physiological parameters and one or more motion parameters; and identify one of the subjects as the fallen person if the one or more physiological parameters corresponding to the subject are determined to be proximate the reference plane; and an alerting system coupled to the processing unit, wherein the processing unit configures the alerting system to generate an audio output, a visual output, an alert message, or combinations thereof, upon determining a reduction in values of the one or more parameters corresponding to the fallen person below corresponding threshold values and wherein the processing unit configures the alerting system to terminate the audio output, the visual out ut the alert message, or combinations thereof, upon determining a change in the values of the one or more parameters corresponding to the fallen person such that the changed values fall within the corresponding threshold values.

16. The system of claim 15, further comprising timing circuitry coupled to the processing unit, wherein the timing circuitry determines a duration of time corresponding to the presence of one or more physiological parameters, one or more motion parameters, a duration of time for which the fallen person is disposed proximate the reference plane, or combinations thereof.

17. A non-transitory computer readable medium that stores instructions executable by one or more processors to perform a method for detecting a fallen person, comprising:

identifying a reference plane and a reference line in a designated space;

monitoring the designated space using one or more range-controlled radars coupled to one or more antennas are configured to define corresponding fields of the one or more range-controlled radars to one or more portions of the designated space, wherein at least one of the one or more portions corresponds to the reference plane;

detecting presence of one or more parameters corresponding to a subject disposed in the designated space using the one or more range-controlled radars, wherein the one or more parameters comprise one or more physiological parameters and one or more motion parameters; and identifying the subject as the fallen person if the one or more physiological parameters corresponding to the subject are detected proximate the reference plane;

continually monitoring the one or more physiological parameters corresponding to the fallen person;

generating an audio output, a visual output, an alert message, or combinations thereof, upon determining a reduction in values of the one or more parameters corresponding to the fallen person below corresponding threshold values; and terminating the audio output, the visual output, the alert message, or combinations thereof, upon determining a change in the values of the one or more parameters corresponding to the fallen person such that the changed values fall within the corresponding threshold values.

\* \* \* \* \*